July 15, 1952  P. A. SWILLEY, SR., ET AL  2,603,261
HACK SAW

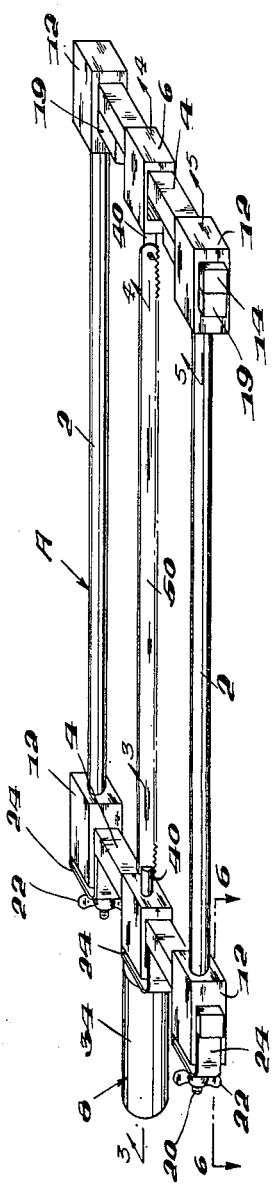
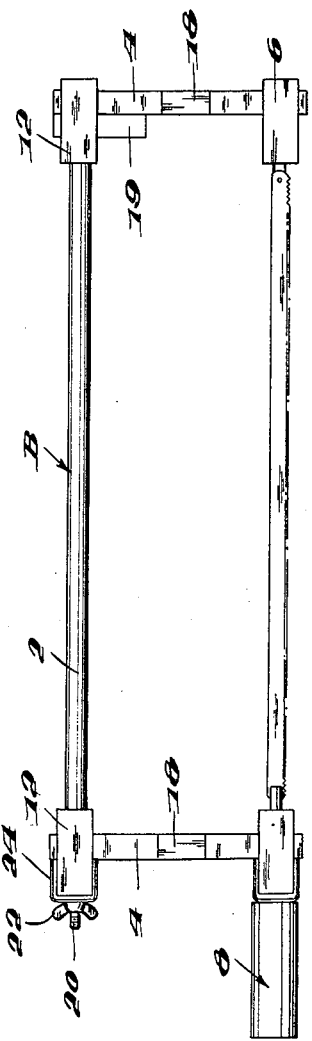

Filed Aug. 28, 1947  2 SHEETS—SHEET 2

Inventor
Payton A. Swilley Sr.
Thomas B. Swilley

By Bailey, Stephens & Huettig
Attorneys

Patented July 15, 1952

2,603,261

UNITED STATES PATENT OFFICE 2,603,261

HACK SAW

Payton A. Swilley, Sr., Jennings, and Thomas B. Swilley, Jacksonville, Fla.

Application August 28, 1947, Serial No. 771,070

1 Claim. (Cl. 145—33)

This invention is directed to a hack saw which may be assembled in alternate forms.

It is the object of this invention to construct a hack saw which can be assembled either in the form of a blade supported in the center of a rectangular frame, in which form the hack saw is used to make long straight cuts through pieces of material of narrow width, or, alternatively, in the common U-frame form of hack saw with the blade forming one side of the rectangle, so a cut can be made through a relatively wide piece of material. Another object is to produce a hack saw frame which can be carried compactly in disassembled form in a mechanic's tool kit. In general, these and other objects are accomplished by forming the hack saw frame of rods which at their ends are so fashioned as to interlock with end bars. The whole frame can be disassembled into its original rod and bar pieces, and by the same token can be rapidly assembled into either one of the alternate forms.

The means by which the objects of the invention are obtained may be more fully understood with reference to the accompanying drawings in which:

Figure 1 is a perspective view of the hack saw assembled in one form;

Figure 2 is a side elevational view of the hack saw assembled in the second form;

Figure 3:
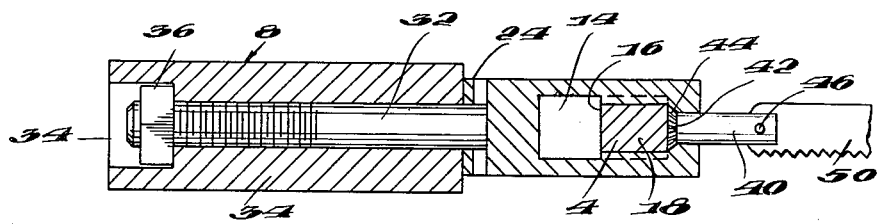
Figure 3 is an enlarged cross-sectional view on line 3—3 of Figure 1.
Figure 4:
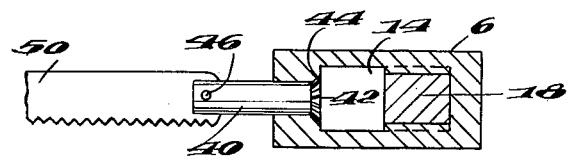
Figure 4 is an enlarged cross-sectional view on the line 4—4 of Figure 1.

In Figure 1 the hack saw A is assembled as a rectangular frame with the blade held in the middle of the frame. This form for a hack saw is especially desirable in making long cuts through a narrow piece of material, such as cutting lengthwise of a piece of pipe. If the ordinary U-frame hack saw is used for this purpose with the blade turned at right angles to the frame, it is extremely difficult, if not impossible, to make a straight cut because the weight of the frame produces a lever action on the blade which makes the blade waver in its cut. When the hack saw blade is mounted in the center of the rectangular frame, equal weight lies on each side of the piece of material being cut, and furthermore the blade can be better steadied by the operator's grasping the frame at each end. Experience has shown that a blade mounted in this manner will produce a long straight cut.

The hack saw of this invention is made of a number of independent rods and bars so fashioned that they can be interlocked with each other to form a demountable frame, which when assembled is strong and rigid. The frame B of Figure 2 is assembled from these pieces to produce the conventional U-frame outline of the ordinary hack saw. However, the construction of the individual pieces is the same for the frames of Figures 1 and 2.

The individual pieces are composed of side rails 2, end bars 4, a blade holding element 6, and a combined handle and blade holding element 8.

Each side rail 2 is composed of a rod having at each end thereof a block 12. This block has a rectangular opening 14 therethrough, which communicates with a narrower rectangular opening 16 to form in effect a keyhole slot.

Each end bar 4 is composed of a square shaped member having adjacent each end and at its center a reduced neck section 18. Bar 4 is of a cross-section just slightly less than the size of the opening 14 in fitting 12, so that the bar will pass through this large opening until the neck portion 18 becomes adjacent the narrower opening 16. Neck portion 18 is then slid into the small opening 16. Because neck portion 18 is of rectangular cross-section, it is held against twisting or rotation in fitting 12.

One fitting 12 on each rod is provided with a threaded extension 20 adapted to receive a wing nut 22. A U-shaped yoke having an aperture in its bight fits over the extension 20, the ends of the legs of the U bearing against bar 4 on each side respectively of fitting 12. As the wing nut 22 is turned down, it forces the yoke 24 against bar 4 and draws up rod 2, thus forcing the neck portion of bar 4 firmly into the fitting 12.

The handle fitting 8 is of similar construction with the following modifications: The threaded extension 32, note Figure 3, for the handle is larger and longer than the extension 22 of fittings 12. The handle 34 is freely rotatable over the extension 32, but has a recess 34 in its outer end which is of the same outline as is the nut 36 screwed upon extension 32. Consequently, a rotation of the handle 34 will cause nut 36 to rotate and thus advance the handle up or down extension 32 as the case may be. A yoke 24 lies beneath the base of handle 34, and it is apparent that as the handle 34 is turned to screw the nut 36 down on stem 32, the yoke 24 will be forced against bar 4 in the same manner as described for the securing of fittings 12.

Fitting 8 receives the means for holding the saw blade. Consequently, the end of this fitting is bored with the inner end of the bore given a beveled ratchet face. The saw holding element 40 is provided with a head 42 having a beveled ratchet face 44 fitting into the countersunk bore. The blade holding extension is slightly less than half round and provided with the usual pin or rivet 46 for holding blade 50 centered with respect to the axis of element 40.

This construction is duplicated for the fitting 6 which is mounted upon end bar 4 for holding the opposite head of blade 50.

Figure 5:
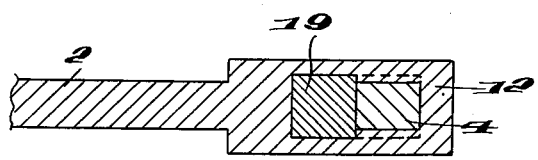
Figure 5 is an enlarged cross-sectional view on the line 5—5 of Figure 1.
Figure 6:
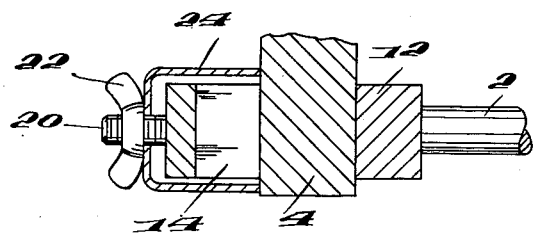
Figure 6 is an enlarged cross-sectional view on the line 6—6 of Figure 1.

As previously indicated, the individual pieces are assembled by inserting bars 4 through fittings 12 and through the handle and opposite end fittings 8 and 6, respectively. To hold bars 4 in place on the right hand ends of the hack saw as viewed in Figs. 1 and 2, short filler bars 19 are inserted into large openings 14, note Fig. 5. The turning of wing nuts 22 tightens the frame and the turning of the handle 8 tightens the saw blade.

When assembled into the form of Fig. 1, two individual rods 2 are used, one being mounted adjacent each end of a bar 4. Handle 8 and fitting 6 then occupy the center portion of bar 4 in the neck portions provided for that purpose. When saw blade 50 is tightened by turning handle 8, the ends of bar 4 are drawn tightly against bars 19 in fittings 12 thus producing a rigid frame. In this assembled form, the hack saw is used for making long straight cuts through narrow pieces of material, it being clear that the material can be no wider than the distance between the side rails 2.

However, when the hack saw is to be used for making a cross cut on, for example, a piece of pipe, one of the side rails is removed and the blade with handle 8 and fitting 6 relocated to occupy the end position on the rods 4 as shown in Fig. 2. In this form, only one bar 19 is used in fitting 12, this bar being held against displacement by being jammed into place by bar 4 as the latter is pulled ever so slightly when the blade is tightened by turning handle 8. While this adjustment is being made, the blade holding elements 40 are loosened in their sockets and rotated 90 degrees so that the plane of the blade lies in the plane of the frame as shown in Fig. 2. The blade forms one side member for the frame. In this position, the blade is able to function as in the ordinary conventional hack saw.

Another important advantage of the invention lies in the fact that being readily disassembled, the individual pieces can be carried conveniently in a mechanic's tool kit. It can be quickly assembled into one or the other alternate forms, all depending upon the need which exists at the moment, and in either form it is rugged and holds the blade so as to produce an accurate saw cut.

Although the invention has been described as being fashioned from end bars of rectangular cross-section which fit into key hole slots of similar cross-section, it is apparent that bars formed of circular, angle, or channel section can be used with complementary slots in fittings 6 and 12 to achieve the objects of the invention. Having now described the means by which the objects of the invention are obtained, we claim:

In a U-shaped demountable hack saw frame having a transverse member and two end members perpendicularly disposed with respect to said transverse member, said transverse member comprising slotted joints connecting said transverse member to said end members, the free end of each of said end members having a slotted fitting secured thereto adapted to hold a hack saw blade therebetween, one of said slotted fittings comprising at one end a threaded extension, a nut threaded upon said extension, a handle having a longitudinal bore therethrough and a recessed portion adapted to engage said nut upon rotation of the handle, said handle turnably mounted upon said threaded extension and concentric therewith, a U-shaped yoke between said handle and said fitting having its legs bearing upon one of said end members, a bore in the opposite end of said fitting, said bore flaring out toward the interior of the fitting, a rod mounted in said bore, means for securing a hack saw blade on one end of said rod, the other end of said rod flaring out to form a flange, said flange comprising a ratchet face upon one of its surfaces, said ratchet face engaging the flaring portion of the bore having said rod mounted therein so as to prevent said rod from turning in said bore.

PAYTON A. SWILLEY, Sr.
THOMAS B. SWILLEY.

REFERENCES CITED

The following references are of record in the file of this patent:

UNITED STATES PATENTS

| Number | Name | Date |
|---|---|---|
| 666,947 | Ward | Jan. 29, 1901 |
| 1,051,193 | Burge | Jan. 21, 1913 |
| 1,087,648 | Duffy | Feb. 17, 1914 |
| 1,126,068 | Okum | Jan. 26, 1915 |
| 1,432,349 | McFarland | Oct. 17, 1922 |
| 1,442,609 | Grieg | Jan. 16, 1923 |
| 1,443,710 | Hale | Jan. 30, 1923 |
| 1,537,459 | Campbell | May 12, 1925 |
| 2,097,172 | Yurkovitch | Oct. 26, 1937 |
| 2,204,390 | Albright | June 11, 1940 |

FOREIGN PATENTS

| Number | Country | Date |
|---|---|---|
| 12,131 | Austria | June 10, 1903 |
| 266,910 | Great Britain | Mar. 10, 1927 |